United States Patent [19]

Stillings

[11] 4,342,465

[45] Aug. 3, 1982

[54] SAFETY WALKER

[76] Inventor: Delia Stillings, 1150 W. Prince Rd.-No. 7-B, Tucson, Ariz. 85705

[21] Appl. No.: 181,042

[22] Filed: Aug. 25, 1980

[51] Int. Cl.³ ........................ A61H 3/04; B62D 11/00

[52] U.S. Cl. .............................. 280/87.02 W; 135/67; 272/70.3; 297/5

[58] Field of Search ................ 280/87.02 W, 87.02 R, 280/7.1; 297/5, 6; 272/70.3, 70.4, 70; 135/67

[56] References Cited

U.S. PATENT DOCUMENTS

| | | | |
|---|---|---|---|
| 265,432 | 10/1882 | Peterson | 272/70.3 |
| 572,613 | 12/1896 | Packard | 272/70.3 |
| 596,425 | 12/1897 | Lindahl | 272/70.3 |
| 635,797 | 10/1899 | Mount | 272/70 X |
| 1,204,249 | 11/1916 | Condon, Jr. | 297/5 X |
| 1,404,572 | 1/1922 | Bowman | 280/87.02 W |
| 1,688,922 | 10/1922 | Drinosky, Jr. | 272/70.3 |
| 3,180,678 | 4/1965 | McCabe | 272/70.3 X |
| 3,488,088 | 1/1970 | Goldberg et al. | 272/70 X |
| 4,140,311 | 2/1979 | Murakami | 280/87.05 X |
| 4,272,071 | 6/1981 | Bolton | 272/70.4 |

FOREIGN PATENT DOCUMENTS

| | | | |
|---|---|---|---|
| 651548 | 11/1962 | Canada | 280/87.02 W |
| 416940 | 1/1967 | Switzerland | 272/70.4 |

*Primary Examiner*—Joseph F. Peters, Jr.
*Assistant Examiner*—Milton L. Smith
*Attorney, Agent, or Firm*—Cahill, Sutton & Thomas

[57] ABSTRACT

A safety walker includes a rigid framework which surrounds the front, back and sides of a handicapped person. The framework includes two sections which are hinged together at one side of the framework. The two sections can be opened with respect to each other to admit entry of the handicapped person. After entry of the handicapped person, the hinged sections are rigidly locked together. A vertically adjustable seat is supported within the framework adjacent to the rear portion thereof. A plurality of legs having outwardly flared lower portions with casters attached thereto support the framework and allow the safety walker to be rolled along a walking surface. A heavily cushioned support cord extends between the front of the seat and the front portion of the framework and functions as a saddle to partially support the weight of the person if he or she stumbles and begins to fall while utilizing the walker. The heavily cushioned cord is detachable at one end to permit convenient entry of the user into the framework.

11 Claims, 7 Drawing Figures

FIG. 1
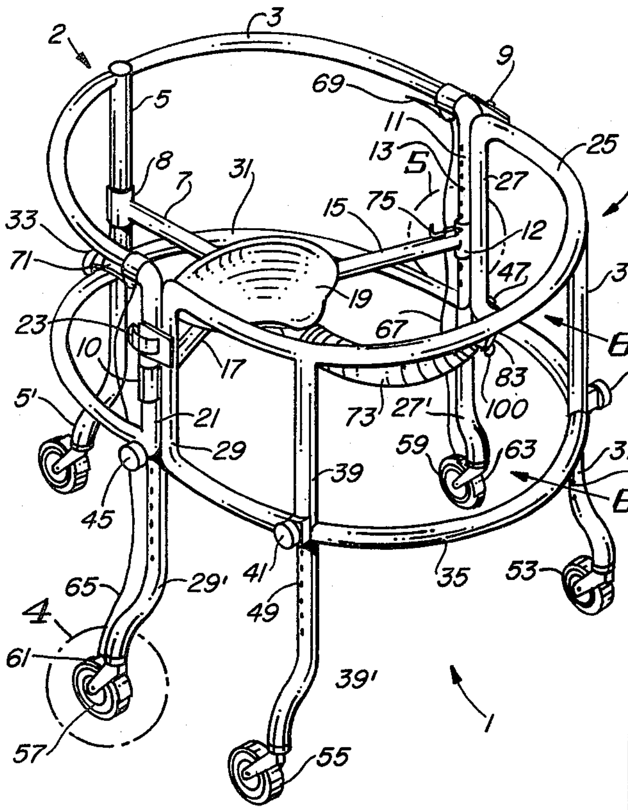
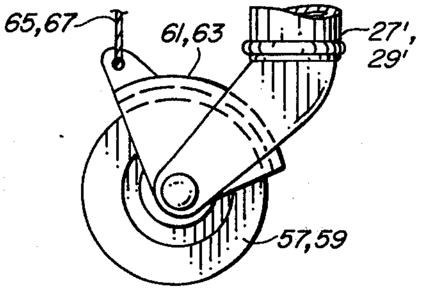
FIG. 4
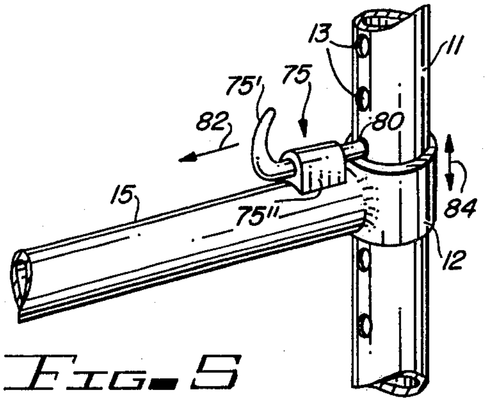
FIG. 5
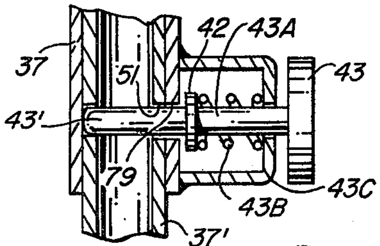
FIG. 6
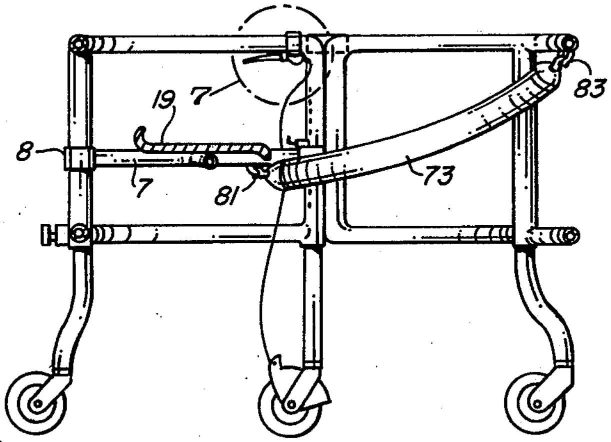
FIG. 2
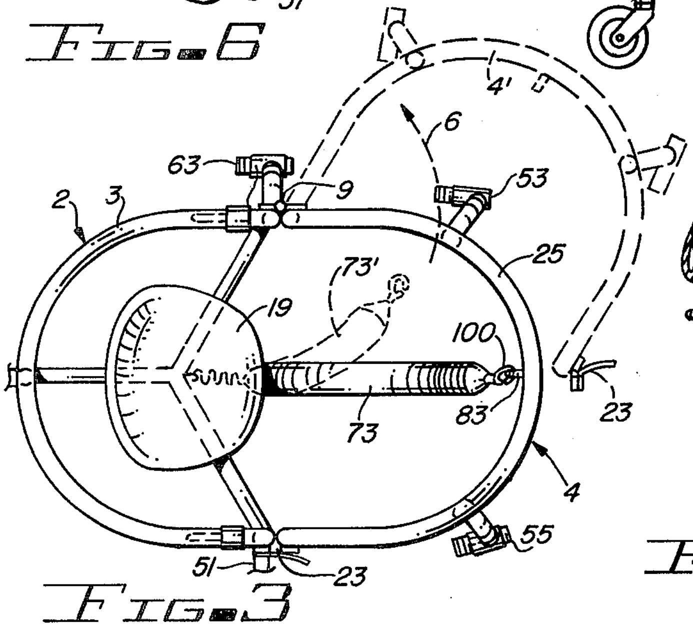
FIG. 3
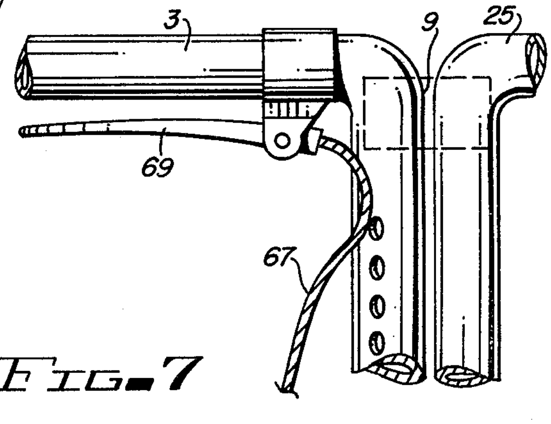
FIG. 7

SAFETY WALKER

BACKGROUND OF THE INVENTION

1. Field of the Invention

The invention relates to walkers for handicapped persons, and more particularly relates to safety walkers, especially walkers which are suitable for use by persons capable of supporting their weight on their legs but who are especially prone to stumbling and falling because of their handicapped condition.

2. Description of the Prior Art

Various types of walkers are commonly used by handicapped or elderly persons who have the strength and capability of supporting their weight on their legs and walking, but cannot do so safely because of their tendency to stumble and fall due to lack of adequate coordination. For example, elderly persons who reside in nursing homes frequently have a great need to exercise and to convey themselves from one location to another, but are afraid to do so without assistance of an aid. A wide variety of walkers have been devised for elderly and/or partially handicapped or disabled persons. Some walkers do not have wheels, and merely comprise a four-legged framework having support rails which can be grasped with either hand. Other types of walkers have crutch attachments. Everest and Jennings, Inc. Of Los Angeles, California, markets a wide variety of walkers which include vertically adjustble rear seats supported by frameworks having four vertical legs with casters on the lower ends. Certain models have an open front, while other models have a lockable gate which opens to admit entry of a user. The frameworks include a pair of opposed parallel rails which can be grasped by the user for support. One model has a padded protective ring disposed above the seat wherein a child can be lowered through the ring so that the child rests on and straddles the seat. However, all of the above-described walkers produced by Everest and Jennings have disadvantages which make the walkers very unsatisfactory for use by partially handicapped persons who are prone to stumbling and falling, especially if the persons who are greatly overweight. If the person loses balance and begins to fall to the right or left while using one of the walkers, the walker may fail to provide the necessary lateral support and may fall over sideways. Furthermore, the person may not have sufficient strength in his arms and shoulders to support his weight within the region surrounded by the walker if the person begins to fall and therefore may fall within the framework to the floor. In addition to the above walker, the state of the art is believed to be indicated by U.S. Pat. Nos. 4,140,311; 3,180,678; 1,688,922; 1,404,572; 1,204,249; 572,613 and 265,432. Up to now, there has been an unmet need for a walker which can be safely, yet easily utilized by an overweight, partially disabled person having a pronounced tendency to stumble, trip, or fall when walking.

Accordingly, it is an object of the invention to provide a walker which can be safely and conveniently utilized by a person having proneness to tripping or falling.

It is another object of the invention to provide a safety walker which is highly stable and is capable of supporting and resisting the weight of a user who begins to fall in any direction while using the walker.

It is another object of the invention to provide a walker which is capable of reliably catching the weight of a user who begins to fall within a region surrounded by the framework of the walker.

SUMMARY OF THE INVENTION

Briefly described, and in accordance with one embodiment thereof, the invention provides a walker including a first section and a second section, the first section being hingeably connected to the second section and having a lock for rigidly locking the two sections together to enclose the front, back, and sides of a person using the walker. In the described embodiment of the invention, the first section is a rear section and the second section is a front section. The first and second sections each include an elevated top rail and a lower rail. The rear section also includes two side legs connected to the upper and lower rails, each of the side legs having a caster attached to its lower end. The front section includes a pair of legs connected to the upper and lower rails and each having a caster on its lower end. The lower portion of each of the legs extends approximately radially outward relative to the region surrounded by the rails of the first and second sections, providing a high degree of stability for the walker. Each of the legs includes a tubular outer portion and a telescoping lower inner portion, allowing the height of the rails to be adjusted. A seat is supported by the rear sections by means of adjustable arms connected to the upper portions of the three legs of the rear section so that the height of the seat is adjustable. A heavily cushioned cord extends between the front portion of the seat and a front portion of the upper rail of the front section. One end of the cushioned cord is detachably hooked to the upper rail, so that the user can unhook the cushioned cord, sit down in the seat, extend the cushioned cord between his legs, and reconnect the cushioned cord to an eyelet rigidly attached to the upper rail of the front section. The cushioned cord is sufficiently heavily cushioned so that if the user stumbles and begins to fall within the region surrounded by the walker, the cushioned cord helps support the person's weight so that the person can regain his or her balance and continue walking. The height of the seat and the tautness of the cord are selected so that the user will fall only a few inches before the cord and/or seat catch the user, "breaking" the user's fall.

In one embodiment of the invention, two of the casters are provided with brakes actuatable by hand-operated brake levers mounted on the upper rails.

BRIEF DESCRIPTION OF THE DRAWINGS

FIG. 1 is a perspective view of the safety walker of the present invention.

FIG. 2 is a side view of the embodiment of the invention shown in FIG. 1.

FIG. 3 is a top view of the embodiment of the invention as shown in FIG. 1.

FIG. 4 is an enlarged side view of one of the casters shown in FIG. 4.

FIG. 5 is an enlarged partial perspective diagram illustrating the adjustable seat supports of the walker shown in FIG. 1.

FIG. 6 is a sectional view taken along section line 6—6 of FIG. 1.

FIG. 7 is an enlarged side view showing a brake lever of the walker in FIG. 1.

DESCRIPTION OF THE INVENTION

Referring now to the drawings, particularly to FIG. 1, walker 1, includes a rear section 2 including a horizontal curved upper rail 3, a lower rail 31 which is parallel to upper rail 3, a tubular brace 5 connecting the rear-most portions of upper rail 3 and lower rail 31, a tubular brace 11 connecting the forward left ends of upper rail 3 and lower rail 31, and a tubular vertical brace 21 connecting the forward right end portions of upper rail 3 and lower rail 31. A rear leg 5′ extends telescopically into vertical tubular brace 5, leg 29′ extends telescopically into vertical tubular brace 21, and leg 27′ extends telescopically into vertical tubular brace 11.

Each of legs 5′, 27′, and 29′ has a plurality of spaced holes therein for allowing convenient adjustment of the height at which upper rail 3 and lower rail 31 are supported by legs 5′, 27′, and 29′ as subsequently described.

Walker 1 also includes a front section 4 including curved upper rail 25, which is horizontal to a walking surface along which walker 1 rolls, and a lower rail 35 which is parallel to upper rail 25. A pair of vertical members 27 and 29 are connected between the rearmost ends of upper rail 25 and lower rail 35. Tubular vertical braces 37 and 39 extend between intermediate portions of upper rail 25 and lower rail 35. Front leg 39′ extends telescopically into brace 39, and leg 37′ extends telescopically into vertical brace 37. Leg 39′ has a plurality of spaced holes such as 49′ for adjusting the height of upper rail 25 and lower rail 35, and leg 37′ has a plurality of similar holes 51 for the same purpose.

The lower portions of legs 29′, 39′, 37′ and 27′ all extend roughly radially outwardly by approximately three inches in order to provide increased stability for safety walker 1.

Referring now to both FIGS. 1 and 6, the elevation of the above-mentioned front and rear sections above the walking surface is determined by which of the various spaced holes in the legs are engaged by pins connected to knobs 33, 45, 41, 43 and 47. FIG. 6 shows an expanded sectional view of knob 43 and a pin 43A, 43′ which extends into one of holes 51. More specifically, pin 43A, 43′ includes a distal end 43′ and a proximal end 43A. Distal end 43′ extends through a hole 79 in tubular brace 37, holes 79 being aligned with hole 51 and leg 37′, thereby connecting walking leg 37′ in fixed relationship to brace 37. A spring 43B is compressed between a flange 42 located between ends 43A and 43′ and the inner wall of a housing 43C through which shaft section 43A extends. Thus, in order to vary the height of the above-mentioned front and rear sections, the user needs to pull the knob, such as 43, outward by an amount sufficient to withdraw shaft section 43′ from hole 51, slide leg 51 further into or further out by tubular braces 37 until another of holes 51 is aligned with hole 79, and release knob 43 so that shaft section 43′ passes through one of holes 51 then aligned with hole 79. By performing this operation for each leg of walker 1, a satisfactory height of upper rail 3, convenient for a particular user, can be achieved.

A seat 19 is supported within the region subtended by upper rail 3 and lower rail 31 of the rear section by means of three support arms 7, 15 and 17. Support arm 7 has a tubular sleeve 8 connected thereto for fitting around tubular brace 5. Similarly, a cylindrical sleeve 12 is attached to the remote end of support arm 15 for slidably fitting around vertical tubular brace 11. A cylindrical sleeve 10 attached to the remote end of support arm 17 slidably fits around vertical brace 21. Each of vertical braces 5, 11 and 21 includes a plurality of spaced holes such as 13, as best seen in FIG. 5. A spring loaded pin 80 is attached to a block 75″. Block 75″ is rigidly attached to support arm 15. Spring loaded pin 80 has a curved end portion 75′ which is useful for gripping spring loaded pin 80 and pulling it in a direction indicated by arrow 82, causing the end of spring loaded pin 80 to be pulled out of one of holes 13. Cylindrical sleeve 12 then can be raised or lowered in the directions indicated by arrow 84. If this operation is performed simultaneously for all three of support arms 7, 15 and 17, the elevation of seat 19 within the region bounded by the above-mentioned front and rear regions can be adjusted. Preferably, the elevation of seat 19 is adjusted so that seat 19 is several inches below the lower portion of the buttocks of the patient or person using walker 1. Then if that person happens to loses balance or fall, he will only fall a few inches before his buttocks hit the forward portion of seat 19, which forward portion extends partially between the legs of the user when the user is seated; this will "break" or slow the fall of the person who ordinarily will be gripping suitable portions of upper rail 3 or upper rail 25. The person will ordinarily continue to grip those rails as he falls, forcing his weight backward toward the seat 19 as he or she falls, or rolling walker 1 forward so that the seat will tend to be moved forward toward the buttocks of the person as he begins falling.

In accordance with another important aspect of the invention, a heavily cushioned cord 73 is attached to the forward portion of seat 19 by means of a connector 81 (FIG. 2) and extends upward to the forward most portion of upper rail 35. The forward portion of cushion cord 73 includes a hook 100 which passes through an eyelet 83. Eyelet 83 is welded to the lower inner surface of upper rail 25. Heavily cushioned cord 73 functions, in essence, as a forward extension of seat 19, extending between the legs of the user of walker 1. Thus, if the user begins to lose balance and fall, or if his or her legs begin to "give way", cushioned cord 73 is located only a few inches beneath the crotch of that person, and will tend to break the person's fall, and prevent said person from sliding forward off seat 19. Cushioned cord 73 can be slightly elastic, or can have a tensioned spring at one end thereof (as indicated by dotted lines) to ease the shock if a person falls hard directly on cushioned cord 73. Cushioned cord 73 can be covered with (for example) heavy upholstered foam, cushioning foam, and can be approximately two inches in diameter. The center of cushioned cord 73 can be composed of chain. Removable links or other means such as a turnbuckle can be provided at one end of cushioned cord 73 to make its length adjustable.

Referring now to FIGS. 1, 2 and 3, the above-mentioned front and rear sections are hingeably connected together by means of a pair of hinges 9 attached to vertical tubular members 11 and 27. Also, a latch assembly 23 is provided for releasably connecting vertical tubular members 29 and 21. If latch assembly 23 is disengaged, then front section 4 can be "opened", or swung away from rear section 2 in the direction indicated by arrow 6 in FIG. 3 and as indicated by dotted line 4′ in FIG. 3. The user then can unhook or disengage hook 100 from eyelet 83, and move cushioned cord 73 aside, (as indicated by dotted line 73′) allowing the user to enter the region surrounded by framework composed of rear section 2 and front section 4, then close front section 4 with respect to rear section 2, engage lock assembly 23, sit on seat 19, pass padded cushion cord 73 between his or her legs, and engage hook 100 with eyelet 83. The person then can stand in front of seat 19, grasping upper rails 3 or 25 at a comfortable location and begin walking forward moving walker 1 forward, confident that if he or she stumbles or trips, he or she will not have far to fall before seat 19 and/or cushion cord 73 will catch him and break his or her fall. The patient then will be able to utilizer walker 1 free from fear which the patient may have of injury due to tripping and falling utilizing prior walkers.

As best seen in FIGS. 1 and 7, a pair of brake mechanisms 61 and 63 are attached to casters 57 and 59, respectively. A pair of brake cords 65 and 67 extend from brake mechanisms 61 and 63, respectively, to hand-operated brake levers 71 and 69, respectively. (FIG. 7 shows an enlarged view of brake lever 69 and brake cable 67). If the patient finds it necessary to lock casters 57 and 59 to prevent rolling of walker 1 on the slope, he can do so.

It should be noted that hinge 9 can be separated, for example, by removing a hinge pin, so that the front and rear sections of walker 1 can be nested together to allow convenient transporting or storage thereof.

While the invention has been described with reference to a particular embodiment thereof, those skilled in the art will be able to make various modifications to the disclosed walker structure without departing from the true spirit and scope of the invention, as set forth in the appended claims.

I claim:

1. A walker for supporting an elderly or disabled person, said walker comprising in combination:

(a) a frame having first and second sections, said frame surrounding a region occupied by the person;

(b) hinge means for pivotally connecting said first and second sections together, said first and second sections being pivotable about said hinge means to allow the person to enter said region by passing between hinged ends of said first and second sections;

(c) locking means for rigidly locking said free ends together after the person has entered said region to securely enclose the person in said region;

(d) gripping means for allowing the person to grip said walker to support himself and to move said walker;

(e) a plurality of legs rigidly attached to respective areas of said first and second sections, each of said legs having a caster attached to the lower end thereof; and (f) a seat connected to one of said first and second sections.

2. The walker of claim 1 further including said seat being rigidly attached to said one of said first and second sections in a rear portion of said region and positioned to catch the person if the person begins to fall from a standing position while using said walker.

3. The walker of claim 2 further including cushioned means extending forward from a front portion of said seat between the legs of the person to a front portion of said walker for catching the person if the person begins to fall from a standing position or begins to slip forward off the forward portion of said seat while using said walker.

4. The walker of claim 3 wherein said cushioned means includes a cord having a front end releasably, rigidly connected to said front portion of said walker, to allow the person to quickly and conveniently disconnect said front end of said cord from said front portion of said walker to ease entry of the person into said region and to allow the person to re-connect said front end of said cord to said front portion after passing said cord between his or her legs.

5. The walker of claim 4 wherein the diameter of said cushioned cord is approximately two inches.

6. The walker of claim 1 wherein the lower portions of at least some of said legs extend outwardly by an amount selected to provide a suitable degree of stability for said walker when said walker is being used by the person.

7. The walker of claim 1 wherein the lengths of the portions of said legs extending below said first and second sections are adjustable.

8. The walker of claim 2 wherein the elevation of said seat with respect to the elevation of said gripping means is adjustable.

9. The walker of claim 1 wherein said gripping means is incorporated in said first and second sections, each of said first and second sections including an upper rail and a lower rail, said upper and lower rails being hingeable, each of said upper and lower rails being substantially U-shaped, each of said first and second sections including bracing means rigidly connecting said upper and lower rails of said first and second sections, respectively.

10. The walker of claim 9 wherein said first section is supported by first, second and third ones of said legs, said first one of said legs being connected to said first section adjacent to said hinging means, said second one of said legs being connected to said first section adjacent to said locking means and said third one of said legs being connected to said first section at a rearmost portion thereof.

11. The walker of claim 9 wherein fourth and fifth ones of said legs are connected, respectively, to opposed forward portions of said second sections.

* * * * *